Nov. 12, 1929.  T. J. STURTEVANT  1,735,479
AIR SEPARATOR
Filed Feb. 4, 1928  3 Sheets-Sheet 3
Fig. 5
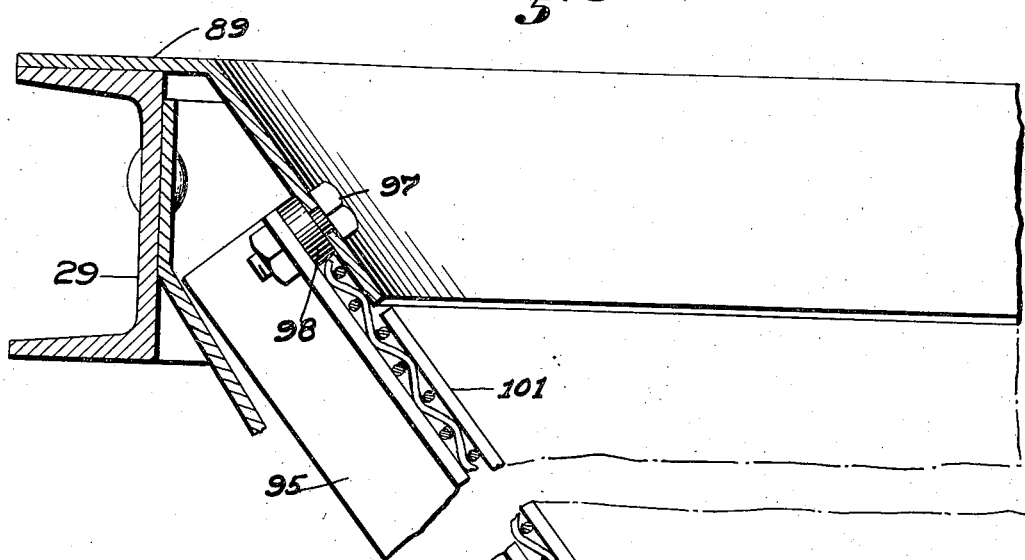
Fig. 6
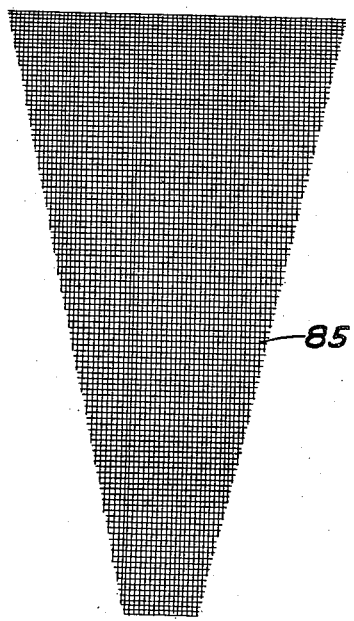
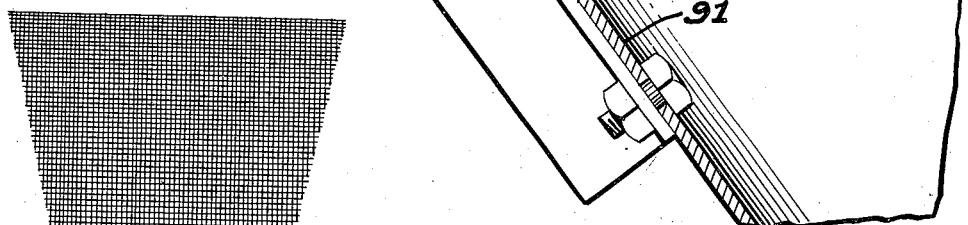
Inventor:
Thomas J. Sturtevant
By Henry T. Williams,
Attorney Patented Nov. 12, 1929

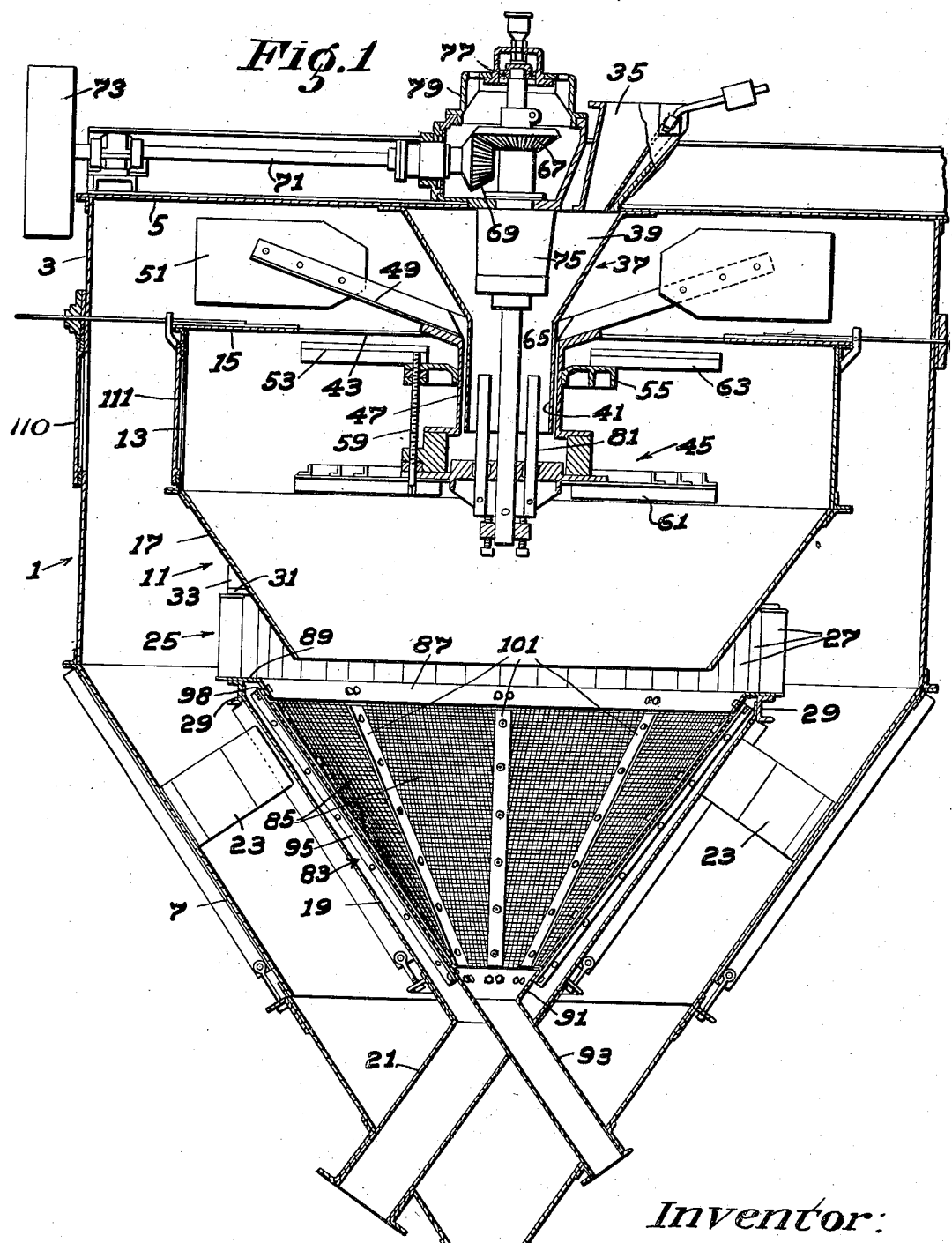

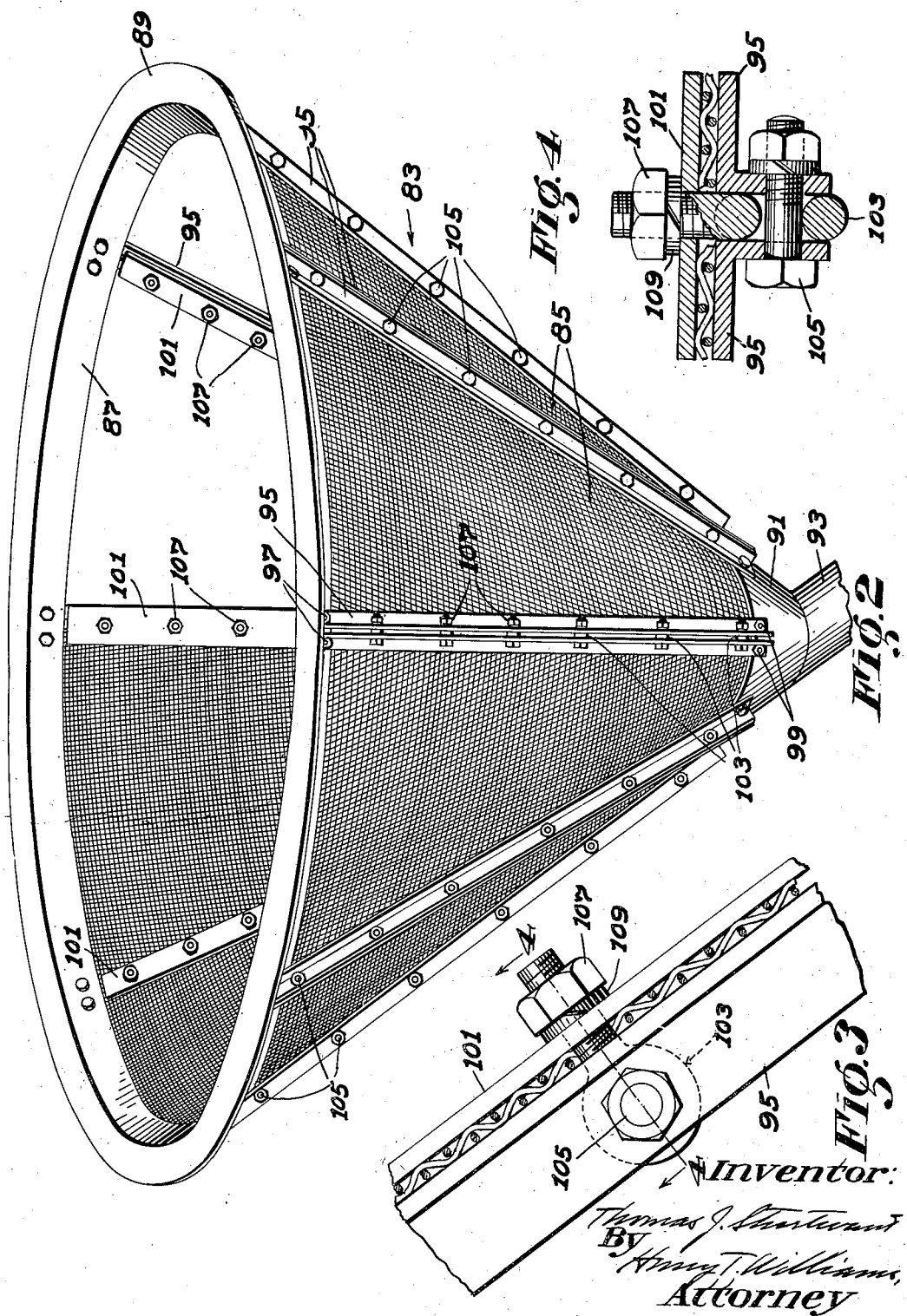

1,735,479

UNITED STATES PATENT OFFICE

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS

AIR SEPARATOR

Application filed February 4, 1928. Serial No. 251,850.

The invention to be hereinafter described relates to separators for grading materials, and more particularly to a combination air and screen spearator.

The air separator is of the type wherein the separation is accomplished by an air current moving upward in a separating chamber and downward in a settling chamber. The air current induced by a fan is caused to circulate through the chambers. The materials to be graded are fed into the separating chamber and are received by a rotary distributor which throws the materials out across the rising air current under the influence of centrifugal force. The lighter particles are carried upward by the air current from the separating chamber over into the settling chamber, where they gravitate downward and are delivered through a spout, while the heavier particles gravitate down through the air current in the separating chamber, and are separately delivered.

The aim and purpose of the present invention is to separate the tailings coming from the separating chamber into two products. To accomplish this, a screen is provided, and in the present instance is in and spaced from the inner casing containing the separating chamber. The tailings are caused to whirl by the air current in the separating chamber, and they are whirled downward and meet the screen in a tangential direction. The finer particles pass through the screen and are delivered through a spout, while the coarser particles pass down over the upper surface of the screen and are delivered through another spout.

This separator may be advantageously used in conjunction with a compartment ball tube mill, such, for example, as disclosed in the copending application of Laurance H. Sturtevant, Serial No. 220,093, filed September 17, 1927. In said application the mill is shown in combination with an air separator so arranged that the air separator is employed in an intermediate stage in the reduction of the materials. The tube mill contains a preliminary reducing compartment, an intermediate reducing compartment, and a finish reducing compartment. The materials pass from the preliminary reducing compartment into the intermediate reducing compartment and are delivered from the latter to the air separator. The fines are delivered to the finish reducing compartment, and the tailings are conducted to the intermediate reducing compartment, where they receive further reduction. This is a good form of apparatus, but for certain purposes it is desirable that the work of reducing the tailings coming from the air separator shall be divided between two compartments. The separator of the present application lends itself advantageously for this purpose. One of the products separated by the screen may be conducted to the preliminary reducing compartment, and the other product separated by the screen may be conducted to the intermediate reducing compartment, thereby increasing the capacity of the apparatus.

The character of the invention may be best understood by reference to the following description of one good embodiment thereof shown in the accompanying drawings, wherein:

Fig. 1 is a vertical section through the separator;

Fig. 2 is a perspective view of the screen wall in the inner casing beneath the separating chamber;

Fig. 3 on an enlarged scale is a side view of the angle bar strip and bolt arrangement for holding margins of adjacent screen sections in assembled relation;

Fig. 4 is a section taken on line 4—4 of Fig. 3;

Fig. 5 on an enlarged scale is a vertical section through the channel, collars and the screen wall extending between and connected to the collars, the wall being broken away intermediate the upper and lower ends thereof; and Fig. 6 is a view of one of the screen sections.

Referring to the drawings, the separator shown therein as one good form of the invention, comprises an outer casing 1 (Fig. 1) consisting of a drum 3 having a head 5 at the upper end thereof and a cone 7 at the lower end thereof terminating in a discharge spout 9.

Within and spaced from the outer casing is an inner casing 11 consisting of a drum 13 having a head 15 at the upper end thereof, and a conical shell 17 at the lower end thereof. Beneath and spaced from said shell is a lower conical shell 19 communicating with a discharge spout 21 which extends through an opening in the cone 7 of the outer casing. The lower shell 19 is supported by legs 23 interposed between and secured to the cone 7 and the shell.

The space between the upper and lower shells of the inner casing serves as an inlet 25 for the passage of the air current from the settling chamber into the separating chamber. To regulate the air current and promote whirl thereof at the inlet, a series of spaced vanes 27 are provided. These vanes are mounted on a channel ring 29 secured to the upper end of the lower shell. A ring 31 rests upon the tops of the vanes and is secured by brackets 33 to the upper shell. The construction is such that the vanes support the upper shell of the inner casing and are adapted to be pivotally adjusted to vary the openings between the vanes and thereby vary the inlet opening and the velocity of the air current passing therethrough. Since this vane construction and arrangement are shown and claimed in my copending application Serial No. 113,395, filed June 3, 1926, it will be unnecessary further to describe them herein.

The materials to be graded are introduced into the separator through an upper hopper 35 and pass therefrom into a lower hopper 37 having a conical body 39 and a neck 41 projecting through an opening 43 in the head of the inner casing and down into the separating chamber.

The materials are delivered through the neck of the lower hopper to a rotary distributor 45 attached to a cylindrical hub 47 encircling the neck. Attached to the upper ends of the hub are arms 49 carrying fan blades 51 occupying the space between the heads of the outer and inner casings. This fan creates the air current which circulates and whirls through the separating and settling chambers.

A baffle plate 53 is located between the rotary distributor and the inner casing head, and is mounted on a ring 55 encircling the hub 47 and carried by screws such as the screw 59 on the distributor. The construction is such that the baffle plate may be vertically adjusted. The distributor has ribs 61 and the baffle plate has ribs 63 which promote whirling of the air in the separating chamber.

The distributor, fan and baffle plate are carried as a unit by a vertical shaft 65 which projects up through the hopper 37 and through an opening in the outer casing head. The shaft is rotated by a bevel gear 67 thereon meshing with a bevel gear 69 on a horizontal shaft 71 journalled in bearings at the top of the outer separator, said shaft having a driving pulley 73 thereon. The shaft 65 is journalled in a lower bearing 75 and in an upper bearing 77 carried by a casing 79 which encloses the bevel gears. The construction of these bearings may be the same as set forth in my application Serial No. 113,395, above referred to.

Projecting up from the rotary distributor are vertical blades 81 for stirring materials as they pass though the hopper neck 41 to the rotary distributor.

In operation, materials introduced into the upper hopper 35 flow down through the lower hopper to the rotary distributor and are thrown outward therefrom under the influence of centrifugal force and across the path of the whirling air current circulating through the separating and settling chambers. The lighter particles are carried by the air current rising through the separating chamber through the space occupied by the fan into the settling chamber and gravitate downward therein, and are delivered through the discharge spout 9. The coarser particles or tailings gravitate downward through the air current in the separating chamber.

Now will be described the means for separating the tailings into two products. This means comprises a screen wall 83 of general conical form and formed of V-shaped sections 85. At the upper end of this screen wall is a collar 87 having a flange 89 resting upon the top of the channel ring 29 referred to, between the upper and lower shells of the inner casing. At the lower end of the screen wall is a tapered collar 91 communicating with a spout 93 which extends through the lower shell and through the cone 7 of the outer casing.

Suitable means is provided for holding the screen sections in assembled relation, and in the present instance adjacent margins of all of the sections are connected by similar means, and therefore, a description of one will suffice for all. This means comprises a pair of angle bars 95 having their upper ends secured by bolts 97 to the collar 87, and their lower ends secured by bolts 99 to the lower collar. The angle bars are spaced from the upper collar by washers 98 on the bolts 97. Opposed to the angle bars 95 is a strip 101 of a length somewhat less than the distance between the upper and lower collars. Adjacent margins of the screen sections are interposed between the angle bars and strip. Eye-bolts 103 have eyes between flanges of the angle bars and are secured thereto by bolts 105 which extend through said eyes and registering holes in the angle bar flanges. The shanks of the eye-bolts project up through holes in the strip 101 and receive nuts 107 which may be held by lock washers 109. When these nuts are tightened the screen sections are clamped between the strips and angle bars. The upper collar overlaps the upper margins of the screen sections, and the lower margins of the screen sections overlap the lower collar and thus ungraded tailings are prevented from passing beneath the screen wall by this shingled like arrangement.

The construction is such that the screen sections are removably secured in their assembled relation. When it is desired to substitute a new section for a worn one, it is merely necessary to remove the nuts 107 and lift away from the angle bars the strips 101 at opposite edges of the screen section. This will allow the section to be easily lifted out and another substituted therefor. Access may be had to the screen wall through a manhole 110 in the outer casing and a manhole 111 in the inner casing.

In operation, the tailings settling in the separating chamber will receive a whirling motion promoted by the vanes at the top of the screen wall and promoted by the vanes on the distributor and baffle plate. The tailings will be swept by this whirling air current across the screen wall and pass diagonally downward, the effect of centrifugal force gradually diminishing from the top of the wall. As the centrifugal effect decreases, the gravity effect increases, so that the particles will always pass tangentially of the openings in the screen. The consequence is that, for example, a screen having about six or eight meshes to the inch will separate from the tailings a product of a size which will pass through a screen having about twenty meshes to the inch. This is advantageous, since it enables a strong, heavy screen to be employed in obtaining a fine product, and the sweep of the air across the screen tends to keep the meshes thereof in open condition for efficient classification of the materials.

By introducing the screen into the separator, necessity of constructing a separate screening apparatus is eliminated with consequent saving in room and cost of construction. The presence of the screen in the separator does not in any way interfere with proper operation thereof, but the screen enjoys the advantage of having the particles conducted to and across it by the whirling air current.

The separator of the present invention is desirable for many uses. One important use is in grading pulverized kiln-run cement clinker. In performing this function, the separator may be combined with a three compartment ball tube mill such as above referred to. The coarser product separated from the tailings would be conducted to the preliminary pulverizing compartment of the mill, and the finer product of the tailings would be conducted to the intermediate pulverizing compartment, and thus the load on these two compartments would be advantageously distributed and the capacity and efficiency of the apparatus increased.

While the screen shown herein for purposes of illustration is woven wire, it will be understood that the term "screen" in the claims is to be construed as generic to other forms of screens, such, for example, as a plate filled with perforations.

It will be understood that the invention is not limited to the specific embodiment shown, and that various deviations may be made therefrom without departing from the spirit and scope of the appended claims.

What is claimed is:

1. A separator for grading materials comprising, in combination, outer and inner casings having a settling chamber between them, said inner casing having a separating chamber therein, a screen wall in the separating chamber and spaced from the inner casing, a passage providing communication between the settling and separating chambers above the screen wall, and means for causing air to circulate through said chambers and passage and whirl tangentially along the inner surface of the screen wall without passing through the screen wall, the latter being adapted to grade the tailings leaving the separating chamber into two products.

2. A separator for grading materials comprising, in combination, outer and inner casings having a settling chamber between them, said inner casing having a separating chamber therein, a screen wall in the separating chamber and spaced from the inner casing, a series of spaced vanes providing a passage between the settling and separating chambers, said screen wall extending down from said vanes, and means for causing air to circulate and whirl through said chambers, through the spaces between the vanes and whirl tangentially along the inner surface of the screen wall without passing through the screen wall, the vanes being arranged to promote whirl of the air, and the screen wall being adapted to grade the tailings leaving the separating chamber into two products.

3. A separator for grading materials comprising, in combination, outer and inner casings having a settling chamber between them, said inner casing having a separating chamber therein, said inner casing having upper and lower spaced shells providing a passage between the settling and separating chambers, a screen wall in and spaced from the lower shell, means for causing air to circulate down through the settling chamber, through the passage, tangentially along the upper surface of the screen wall and up through the separating chamber, and means to introduce materials to be graded into the separating chamber, said screen wall being adapted to separate the tailings whirled by the air along the screen wall into two products.

4. A separator for grading materials comprising, in combination, outer and inner casings having a settling chamber between them, said inner casing having a separating chamber therein, said inner casing having upper and lower shells spaced to provide a passage between the settling and separating chambers, a screen wall in the lower shell directly beneath said passage, and means to cause air to circulate and whirl down in the settling chamber, through said passage, whirl tangentially along the upper surface of the screen wall and up in the separating chamber, said upper shell being formed to deflect the whirling air downward over the screen wall, and the latter being adapted to separate the tailings leaving the separating chamber into two products.

5. A separator for grading materials comprising, in combination, outer and inner casings having a settling chamber between them, said inner casing having a separating chamber therein, a conical screen wall in the lower part of the separating chamber and spaced from the inner wall, a passage providing communication between the settling and separating chambers above the screen wall, means to cause air to circulate and whirl downward in the settling chamber, through the passage, tangentially along the upper surface of the screen wall and up in the separating chamber, said screen wall being adapted to separate the tailings leaving the separating chamber into two products, and spouts, one for conducting the product passing through the screen wall, and the other for conducting the product passing downward over the upper surface of said wall.

6. A separator for grading materials comprising, in combination, outer and inner casings having a settling chamber between them, said inner casing having a separating chamber therein, said inner casing having an upper shell and a lower conical shell spaced from the upper shell to provide a passage between the settling and separating chambers, a conical screen in and spaced from the conical shell, means to introduce materials to be graded into the separating chamber, a rotary distributor for receiving the materials and throwing the same outward under the influence of centrifugal force, and means to cause air to whirl and circulate down in the settling chamber, through the space between the shells, tangentially along the screen, up in the separating chamber and across the path of the materials thrown outward in the separating chamber, said screen being adapted to grade the tailings gravitating downward from the separating chamber into two products.

7. A separator for grading materials comprising, in combination, outer and inner casings having a settling chamber between them, said inner casing having a separating chamber therein, said inner casing having an upper shell and a lower conical shell spaced from the upper shell to provide a passage between the chambers, a collar at the upper end of the conical shell, a lower collar, a screen extending between and carried by the collars and formed of removable sections, means for introducing materials to be graded into the separating chamber, and means for causing air to whirl and circulate down in the settling chamber, through the passage, tangentially along the screen and up in the separating chamber, said screen being adapted to separate the tailings delivered from the separating chamber into two products.

THOMAS J. STURTEVANT.